(12) United States Patent
Childers et al.

(10) Patent No.: US 6,305,795 B2
(45) Date of Patent: *Oct. 23, 2001

(54) INK CONTAINER HAVING ELECTRONIC AND MECHANICAL FEATURES ENABLING PLUG COMPATIBILITY BETWEEN MULTIPLE SUPPLY SIZES

(76) Inventors: Winthrop D. Childers, 15606 Bernardo Ctr Dr. #3201, San Diego, CA (US) 92127; Michael L. Bullock, 16225 Avenida Suavidad, San Diego, CA (US) 92128; Bruce Cowger, 37194 Helm Dr., Corvallis, OR (US) 97330; John A. Underwood, 3415 NE. 113th St., Vancouver, WA (US) 98686; Susan M. Hmelar, 2015 SW. Whitesdie Dr., Corvallis, OR (US) 97333; James E. Clark, 4771 Bramblewood La., NW., Albany, OR (US) 97321; Paul D. Gast, 4417 NW. Aspen St., Camas, WA (US) 98607; John A. Barinaga, 4135 SW. View point Ter., Portland, OR (US) 97201; David O. Merrill, 1780 NW. Arthur, Corvallis, OR (US) 97330

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/328,315

(22) Filed: Jun. 8, 1999

Related U.S. Application Data

(63) Continuation of application No. 08/869,152, filed on Jun. 4, 1997, now Pat. No. 5,956,057, and a continuation-in-part of application No. 08/789,958, filed on Jan. 30, 1997, now Pat. No. 6,142,617, which is a continuation-in-part of application No. 08/785,580, filed on Jan. 21, 1997, now Pat. No. 5,812,156, which is a continuation-in-part of application No. 08/706,061, filed on Aug. 30, 1996, now abandoned, which is a continuation-in-part of application No. 08/584,499, filed on Jan. 8, 1996, now Pat. No. 5,699,091, which is a continuation-in-part of application No. 08/429,915, filed on Apr. 27, 1995, now Pat. No. 5,825,387.

(51) Int. Cl.[7] .................................................. B41J 2/175
(52) U.S. Cl. ......................................................... 347/86
(58) Field of Search ................................. 347/85, 86, 87, 347/49, 50, 7

(56) References Cited

U.S. PATENT DOCUMENTS

| 4,568,954 | 2/1986 | Rosback ................................. 347/86 |
| 4,961,088 | * 10/1990 | Gilliland et al. ..................... 355/206 |

(List continued on next page.)

FOREIGN PATENT DOCUMENTS

| 0322131A | 6/1989 | (EP) | ................................ B41J/3/04 |
| 0374884 | 6/1990 | (EP) | ................................ B41J/2/175 |

(List continued on next page.)

Primary Examiner—N. Le
Assistant Examiner—Michael Nghiem
(74) Attorney, Agent, or Firm—Kevin B. Sullivan; Winthrop D. Childers

(57) ABSTRACT

The present invention is an ink container for use in an ink jet printing system. The printing system has a printhead under control of printing system electronics and an ink container receiving station for providing ink to the printhead. The replaceable ink container includes a plurality of container interfacing features positioned on the ink container to engage corresponding ink container receiving station interfacing features. The ink container interfacing features are disposed and arranged to allow a plurality of different sizes of the ink container to be installed at a particular location of the receiving station. The ink container also includes an information storage device that provides information indicative of a volume of ink contained in said ink container.

28 Claims, 6 Drawing Sheets

U.S. PATENT DOCUMENTS

| | | | |
|---|---|---|---|
| 4,974,020 | 11/1990 | Takamatsu et al. | 355/206 |
| 5,138,344 * | 8/1992 | Ujita | 347/86 |
| 5,365,312 | 11/1994 | Hillmann et al. | 355/206 |
| 5,414,452 | 5/1995 | Accatino et al. | 347/7 |
| 5,506,611 | 4/1996 | Ujita et al. | 347/86 |
| 5,512,926 | 4/1996 | Uchikata et al. | 347/86 |
| 5,574,484 * | 11/1996 | Cowger | 347/7 |
| 5,583,549 * | 12/1996 | Ujita et al. | 347/86 |
| 5,610,635 | 3/1997 | Murray et al. | 347/7 |
| 5,699,091 * | 12/1997 | Bullock et al. | 347/19 |
| 5,825,387 * | 10/1998 | Cowger et al. | 347/86 |
| 6,203,147 * | 3/2001 | Battery et al. | 347/86 |

FOREIGN PATENT DOCUMENTS

| | | | |
|---|---|---|---|
| 0526062 | 2/1993 | (EP) | B41J/25/34 |
| 0593282A | 4/1994 | (EP) | B41J/2/175 |
| 0626268 | 11/1994 | (EP) | B41J/25/34 |
| 0639462A | 2/1995 | (EP) | B41J/2/175 |
| 0685340A | 12/1995 | (EP) | B41J/2/175 |
| 0720916A2 | 7/1996 | (EP) | B41J/2/175 |
| 0729836A | 9/1996 | (EP) | B41J/2/175 |
| 0729845A | 9/1996 | (EP) | B41J/2/175 |
| 0741038A | 11/1996 | (EP) | B41J/2/175 |
| 08197748 | 8/1996 | (JP) | B41J/2/175 |
| WO96/34761 | 11/1996 | (WO) | B41J/2/175 |

* cited by examiner

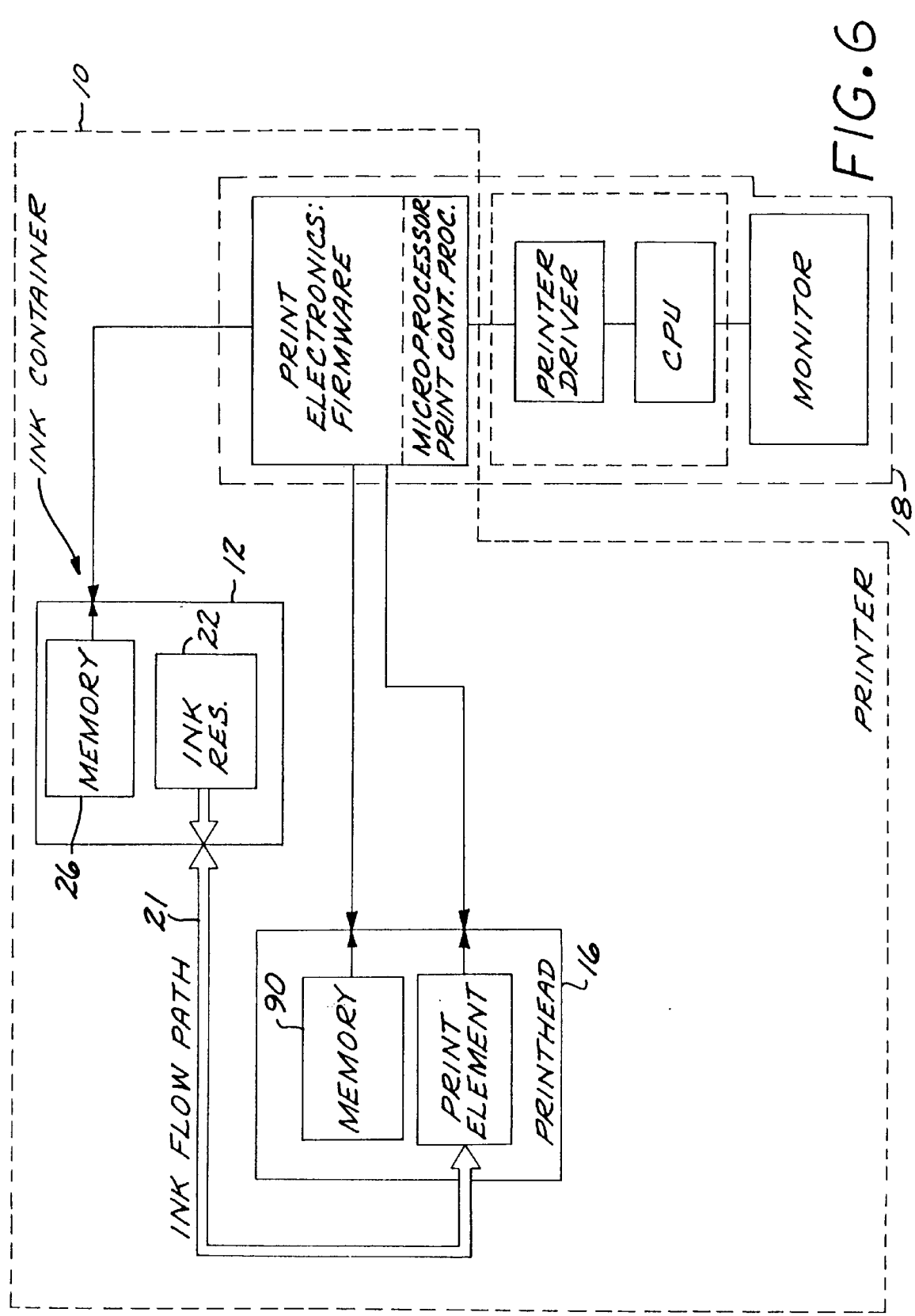

INK CONTAINER HAVING ELECTRONIC AND MECHANICAL FEATURES ENABLING PLUG COMPATIBILITY BETWEEN MULTIPLE SUPPLY SIZES

CROSS REFERENCE TO RELATED APPLICATIONS

This is a continuation of application Ser. No. 08/869,152 filed on Jun. 4, 1997, now U.S. Pat. No. 5,956,057.

This application is a continuation-in-part of U.S. patent application Ser. No. 08/584,499 filed Jan. 8, 1996, entitled "Replaceable Part With Integral Memory For Usage, Calibration And Other Data", now U.S. Pat. No. 5,699,091. This application is a continuation-in-part of U.S. patent application Ser. No. 08/429,915 filed Apr. 27, 1995, entitled "Ink Supply For An Ink-Jet Printer", now U.S. Pat. No. 5,825,387. This application is a continuation-in-part of U.S. patent application Ser. No. 08/785,580 filed Jan. 21, 1997, entitled "Apparatus Controlled by Data from Consumable Parts with Incorporated Memory Devices", now U.S. Pat. No. 5,812,156, incorporated herein by reference. This application is also a continuation-in-part of U.S. patent application Ser. No. 08/789,957 filed Jan. 30, 1997, now U.S. Pat. No. 6,142,617, entitled "Ink Container Configured for Use with Compact Supply Station", incorporated herein by reference and which is a continuation in part of U.S. patent application Ser. No. 08/706,061 filed Aug. 30, 1996, entitled "Ink-Jet Printing System With Off-Axis Ink Supply And High Performance Tubing", now abandoned, incorporated herein by reference. This application is also related to commonly assigned "Electrical and Fluidic Interface For An Ink Supply", application Ser. No. 08/791,290 filed Jan. 30, 1997, now U.S. Pat. No. 6,203,147, "Electrical Interconnect For Replaceable Ink Containers", application Ser. No. 08/789,958, filed Jan. 30, 1997, now U.S. Pat. No. 6,168,262, and "Mechanical and Electrical Keying Arrangement which Assures Compatibility of a Replaceable Ink Cartridge and a Receiving Printer", U.S. patent application Ser. No. 08/857,722, now abandoned, filed May 16, 1997, the entire contents of which are incorporated by reference herein.

BACKGROUND OF THE INVENTION

This invention relates to inkjet printers and the like and, more particularly, to an ink container having mechanical and electronic features that allow different sizes of ink containers to be plug compatible while providing an automatic and accurate way of tracking ink remaining in the ink container.

Ink-jet printers or printing systems frequently make use of an ink-jet printhead mounted to a carriage which is moved back and forth across a print media, such as paper. As the printhead is moved across the print media, control electronics activate the printhead to eject, or jet, ink droplets onto print media to form images and characters.

Some printing systems make use of an "off-carriage" or "off-axis" ink container that is replaceable separately from a high performance printhead wherein the ink container is located off of the carriage. When the ink container is exhausted the ink container is removed and replaced with a new ink container. The use of replaceable ink containers that are separate from the printhead allow users to replace the ink container without replacing the printhead and allows for larger ink supplies than would be practical on a scanning carriage. The printhead is then replaced at or near the end of printhead life and not when the ink container is exhausted. This tends to lower the average cost per printed page for the system and can decrease the frequency of ink container replacement.

Generally, the frequency of replacement of ink containers is determined by the initial volume of ink held in the ink containers and the rate of consumption of the ink. An ink container that is smaller requires more frequent ink container replacement for a given usage rate. This can be inconvenient to the user. A related problem occurs if the printer runs out of ink while printing a document. When this happens, the user must reprint at least part of the printed document. This results in wasted ink and media. With a combination of high use rate printing and small ink containers, running out of ink and reprinting documents can become a very frequent event, resulting in considerable inconvenience and waste of ink and media.

The use of a larger ink container results in a less frequent ink container replacement for a given usage rate. If the container is too large, the container may reside in the printer beyond the ink shelf life. When this happens, the user must decide between replacing the container or using the ink. Replacing the container implies throwing away unused ink. On the other hand, using old ink may damage the printhead or printer. Thus, too large of an ink container will at least negatively impact cost per printed page and/or printing system reliability.

Accordingly, it is desirable to have inkjet printing systems that conveniently, reliably, and cost-effectively accommodate a range of ink usage rates.

SUMMARY OF THE INVENTION

The present invention is a replaceable ink container for use in an inkjet printing system. The printing system has a printhead under control of printing system electronics and an ink container receiving station for providing ink to the printhead. The replaceable ink container includes a plurality of container interfacing features positioned on the ink container to engage corresponding ink container receiving station interfacing features. The ink container interfacing features are disposed and arranged to allow a plurality of sizes of the container to be installed at a particular location in the receiving station. Also, the ink container includes an information storage device that electrically couples to the printing system and provides information indicative of a volume of ink contained in the ink container.

BRIEF DESCRIPTION OF THE DRAWINGS

FIG. 6 is a block diagram of the components of the ink jet printing system illustrated in FIG. 2.

DETAILED DESCRIPTION OF THE PREFERRED EMBODIMENT

Figure 1:
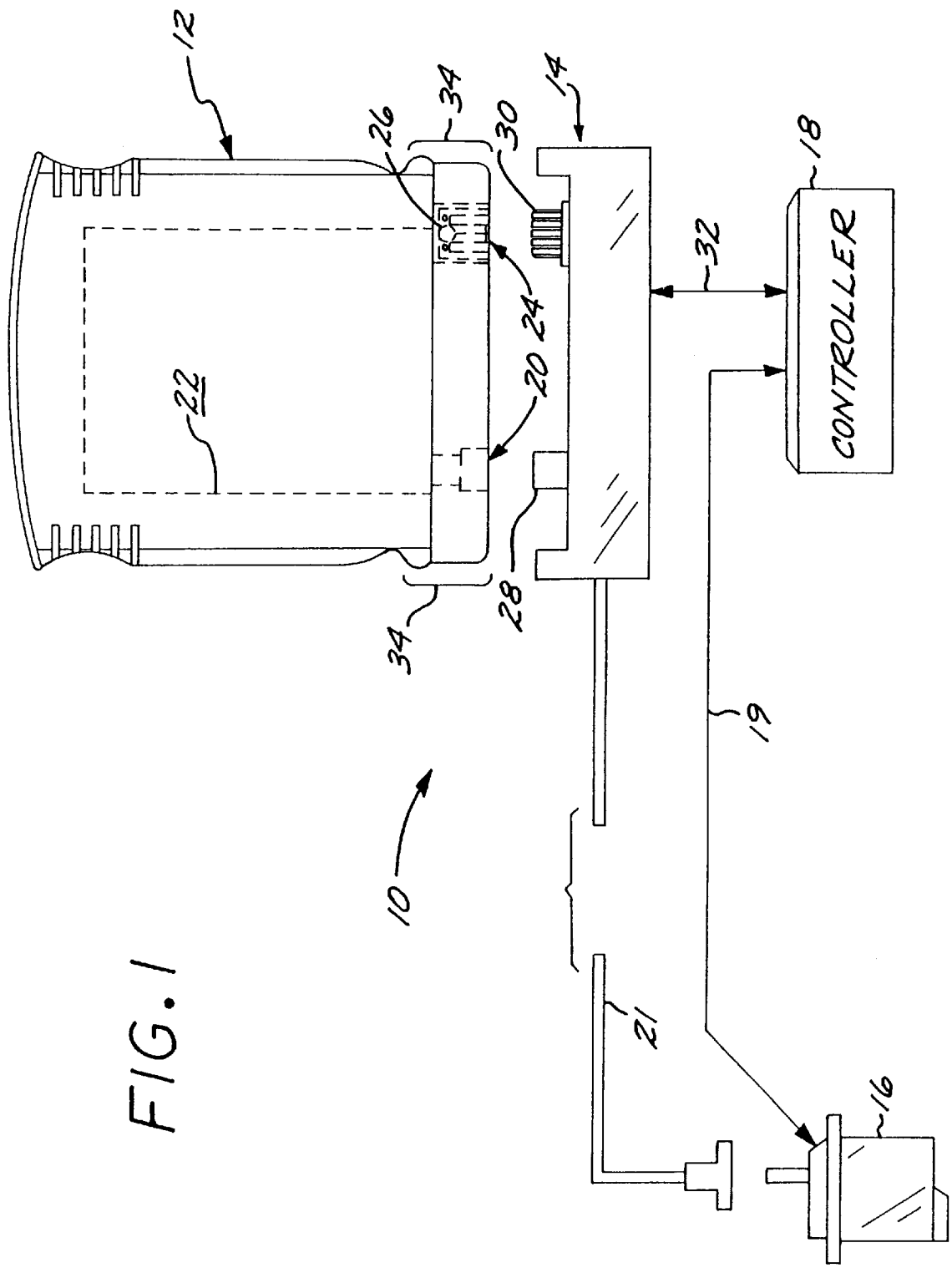
FIG. 1 shows a schematic representation of the printing system showing an ink container of the present invention which forms a fluid interconnect and an electrical interconnect with the printing system.

FIG. 1 is a schematic representation which depicts an ink-jet printing system 10 that includes an ink cartridge or ink container 12 of the present invention. The ink-jet printing system 10 also includes an ink supply station or ink container receiving station 14 for receiving ink container 12, an ink jet printhead 16 and controller or printing system electronics 18. Printing is accomplished by the printing system 10 by the ejection of ink from the printhead 16 under the control of printing system electronics 18. The printhead 16 is connected to the printing system electronics 18 by a printhead data link 19 for controlling ejection of ink. Ink is provided to the printhead 16 by way of a fluid conduit 21 which fluidically connects the printhead 16 to the receiving station 14. The ink container includes an ink outlet 20 which is in fluid communication with a fluid reservoir 22. The ink container 12 includes a plurality of container electrical contacts 24 which are electrically connected to an information storage device or memory element 26.

The ink outlet 20 and the electrical contacts 24 allow the ink container 12 to reliably interconnect with a fluid inlet 28 and receiving station electrical contacts 30, respectively, associated with the ink container receiving station 14. The receiving station 14 enables ink to be transferred from the fluid reservoir 22 associated with the ink container 12 to the printhead 16 via the fluid conduit 21. In addition, the ink container receiving station allows the transfer of information between the information storage device 26 associated with the ink container 12 and the printing system electronics 18 via a link 32.

The present invention relates to a combination of container interfacing features that allow multiple sizes of the ink container 12 to be received in receiving station 14 as well as electronic features that provide information to the printing system 10 to determine a volume of available ink in the ink container 12. By determining the volume of available ink, the printing system 10 can determine an ink level condition of ink container 12 such as a low ink or out of ink condition.

During the life of the printer, printhead 16 and ink container 12 are periodically replaced. Ink container 12 is a relatively frequently replaced component. On the other hand, printhead 16 has a lower replacement rate and can even be permanent. To avoid adding unnecessary cost per page, it is critical that printing system 10 prevent premature damage to printhead 16.

Ink container 12 is sized according to the rate of usage of ink. If the ink container is too small, it will need to be replaced frequently at a loss of convenience to the user. On the other hand, if the container is too large, it may reside in the printer for a time beyond shelf life. Beyond shelf life ink will degrade print quality or even cause permanent damage to the printhead 16 or the printing system 10.

Beyond shelf life ink can affect the printhead in a number of ways. As ink is stored, it loses volatile components, i.e., water, solvents, etc. As the concentration of non-volatile components increases, the ink can turn to sludge or even precipitate. Sufficiently old ink could completely clog the printhead 16 and/or conduit 21, requiring printhead replacement or even printer servicing. At the very least, the print quality will be degraded since the printhead is tuned to operate best with ink in a particular viscosity and surface tension range. The user may interpret any degradation in print quality as a need to replace printhead 16, ink container 12, or both.

Thus, it is desirable that the same printing system 10 address multiple use rate environments. To this end, the ink container interfacing features are disposed and arranged to allow multiple sizes of the ink container 12 to be installable or insertable at a particular location in ink container receiving station 14. The container interfacing features include the fluid outlet 20, the container electrical contacts 24, and a plurality of container positioning features 34 that engage corresponding receiving station positioning features (not shown) to be discussed in more detail later.

Activating printhead 16 without an adequate supply of ink from container 12 can result in printhead damage. To prevent this, the present invention includes information storage device 26 that provides information to the printing system electronics 18 indicative of an available volume of ink contained in ink container 12. This parameter is preferably updated periodically. If the parameter is indicative of an out of ink condition in ink container 12, the printing system electronics 18 takes action such as halting printing to avoid damage to printhead 16.

Figure 2:
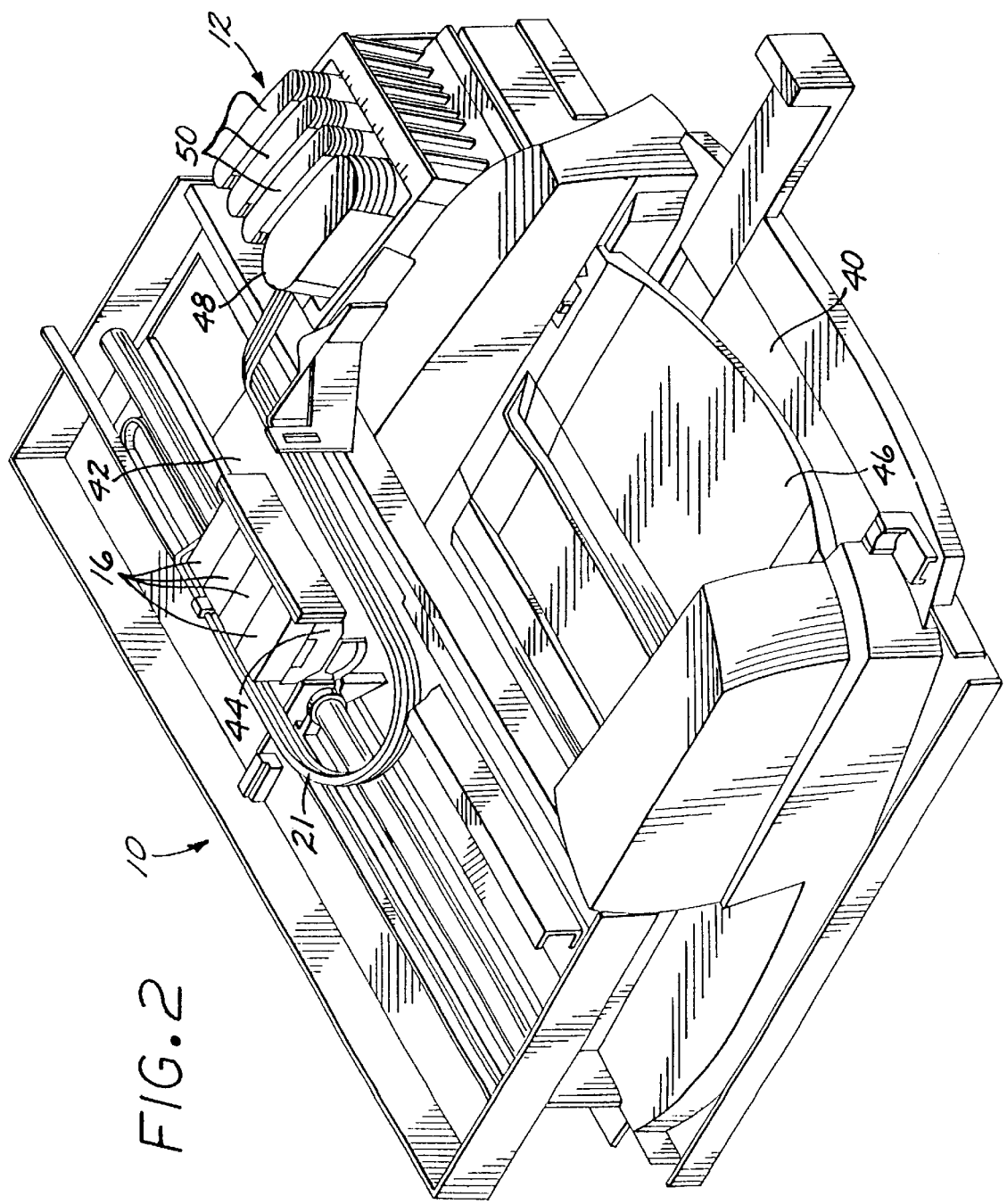
FIG. 2 is a perspective view of a printer with cover removed, which incorporates the ink container of the present invention.

Turning to FIG. 2, one embodiment of printing system 10 is depicted. Shown is a printer 10, with its cover removed, containing a plurality of ink containers 12. Printer 10 includes a tray 40 for holding a supply of media, such as paper. When a printing operation is initiated, a sheet of media from tray 40 is fed into printer 10, using a sheet feeder (not shown). During printing, media sheets pass through print zone 42 whereupon a scanning carriage 44 containing one or more printheads 16, is scanned across the sheet for printing a swath of ink thereon. The sheet of paper is stepped through the print zone 42 as the scanning carriage 44 prints a series of swaths of ink to form images thereon. After printing is complete, the sheet is positioned in an output tray 46 and the process repeats.

As printheads 16 eject ink onto media, they are replenished by conduits 21 that are fluidically connected to ink containers 12. Ink containers 12 are periodically replaced with a frequency determined by the initial volume of deliverable ink and a usage rate. Ink containers 12 are called "off-carriage" because they are located in stationary ink supply station 14 off the scanning carriage 44. This configuration allows for larger ink containers than would be practical on carriage 44. Ink containers can therefore be sized as large as user needs dictate.

The illustrated printing system is a general purpose printer such as one to be used in a typical office or home environment. This printing system 10 accepts ink containers of varying sizes and volumes to accommodate varying rates of ink usage. In the illustration shown, a relatively larger ink container 48 containing a higher use rate colorant is provided along with a plurality of smaller ink containers 50 containing lower use rate colorants. The volumes of each colorant are selected to be large enough to minimize the replacement frequency and small enough to avoid exceeding the shelf life given the particular printer application.

A more specific printer example is the following: Black is the higher use rate colorant for container 48 and each of cyan, yellow, and magenta inks are lower use rate colorants within ink container 50. In this example, the black ink container would have a 70–80 cc volume to accommodate very frequent text printing in an office environment and the color ink containers would each have a 20–30 cc volume to accommodate lower use rate color printing to occasionally highlight documents. This same printer can also be used in a home environment wherein the text printing frequency is much lower. For this lower use rate situation, a smaller 20–30 cc black ink container 48' (not shown) would be preferred. Accordingly, ink containers 48 and 48' are adapted to be insertable or installable at the same location in printer 10. In addition, ink containers 48 and 48' each have information storage devices that allow the printing system 10 to determine the available ink in each of ink containers 48 and 48' to avoid printing after an out of ink condition.

The above specific example is only illustrative of one specific application of the invention to black text printing. For example, there may be color ink containers 50', each of which is installable in the same location as a color container 50, wherein containers 50 and 50' have different volumes of available ink. These may have different fill levels or even be of multiple sizes. The color containers 50 may contain other colorants (red, green, blue) or colorant concentrations as well. There might be a high volume version of a color ink container 50 for high density and/or more frequent color printing and a lower volume 50' version for lower density and/or less frequent printing.

In a preferred embodiment, all of the ink containers 12 are the same height to make it easier to install them and to make the supply station 14 more compact. The size of the supply station impacts overall printing system size, which needs to be kept at a minimum to preserve desktop space and provide a lower printing system cost. Ink container 12 is therefore adapted to allow multiple widths of ink container 12 to be plug compatible with receiving station 14 while providing containers of uniform height.

Figure 3:
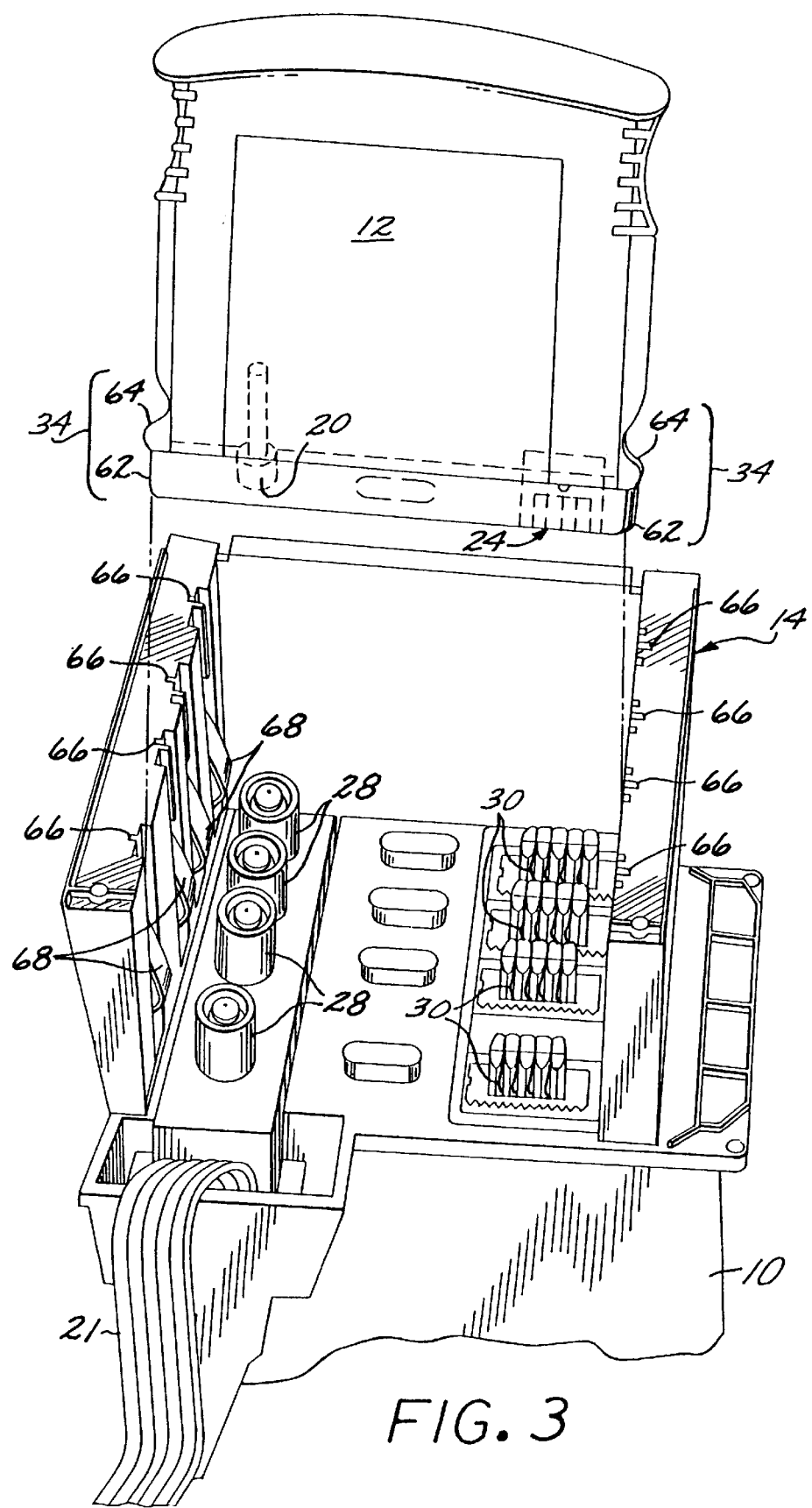
FIG. 3 is an ink supply receiving station of the type used in the printing system of FIG. 2, shown broken away, with an ink container positioned for insertion into the ink supply receiving station.

Turning to FIG. 3, ink container 12 is shown positioned for insertion into a container receiving station 14. The plurality of container positioning features 34 include aligning features 62 and latching features 64. The aligning features 62 are configured to engage corresponding guiding features 66 to guide ink container 12 into the receiving station 14. The aligning features 62 are preferably positioned on opposite sides of the ink container 12. Positioning the aligning features on opposite ends of cartridge 14 eliminates any need for partition walls between cartridges 12 during insertion. Not having partition walls allows for a lower cost and more compact ink supply station 14.

Ink container 12 has an elongate cross section perpendicular to the direction of its insertion into receiving station 14. Aligning features 62 are positioned at opposite ends of the elongate cross section, with the elongate shape of ink container 12 maximizing the distance between the aligning features 62. Preferably, aligning features 62 are disposed adjacent to a leading edge 72 of ink container 12 relative to a direction of insertion. Placing the features at these locations improves alignment between fluid outlet 20 and fluid inlet 28 and improves alignment between container contacts 24 and receiving station contacts 30.

In order for supply station and ink container parts to be of acceptable cost, they tend to be constructed of molded plastic without extremely precision tolerances (i.e., without perfect dimensional accuracy). Thus, the aligning features 62 on ink container 12 are slightly smaller than the guiding features 66 on receiving station 14. As a result, during installation of ink container 12 into receiving station 14, there is some placement variation between the respective features that engage. The farther these features are from the fluid outlet 20 and the container contacts 24, the more effect angular variations in the supply insertion will affect placement between the fluid outlet 20 and the fluid inlet 28 as well as the between the container electrical contacts 24 and the receiving station electrical contacts 30. Placing the alignment features 62 adjacent to the leading edge 72 minimizes this distance, thereby minimizing such critical placement variation. In addition, maximizing the distance between aligning features 62 minimizes the angular variation of ink container 12 during installation relative to an axis aligned with the direction of installation. Finally, by placing the fluid outlet 20 and the container contacts 24 close to the opposite ends of container 12 further minimizes the distance between the aligning features and the fluid outlet 20 and the container contacts 24, and this further improves alignment accuracy of the fluid outlet 20 to the fluid inlet 28 and the container contacts 28 to the receiving station contacts 30.

Once ink container 12 is properly aligned and inserted into receiving station 14, a latch 68 engages a corresponding latch feature 64 on ink container 12 to latch ink container 12 into a receiving station 14. At such time, the fluid inlet 28, associated with receiving station 14, engages the corresponding fluid outlet 20 on ink container 12 allowing a fluid flow into fluid conduit 21.

Insertion of ink container 12 into receiving station also forms an electrical interconnect between ink container 12 and receiving station 14. More specifically, container electrical contacts 24 associated with the ink container 12 engage corresponding receiving station electrical contacts 30 associated with receiving station 14 to allow information to be transferred between printing system electronics 18 and information storage device 26.

Figures 4A, 4B:
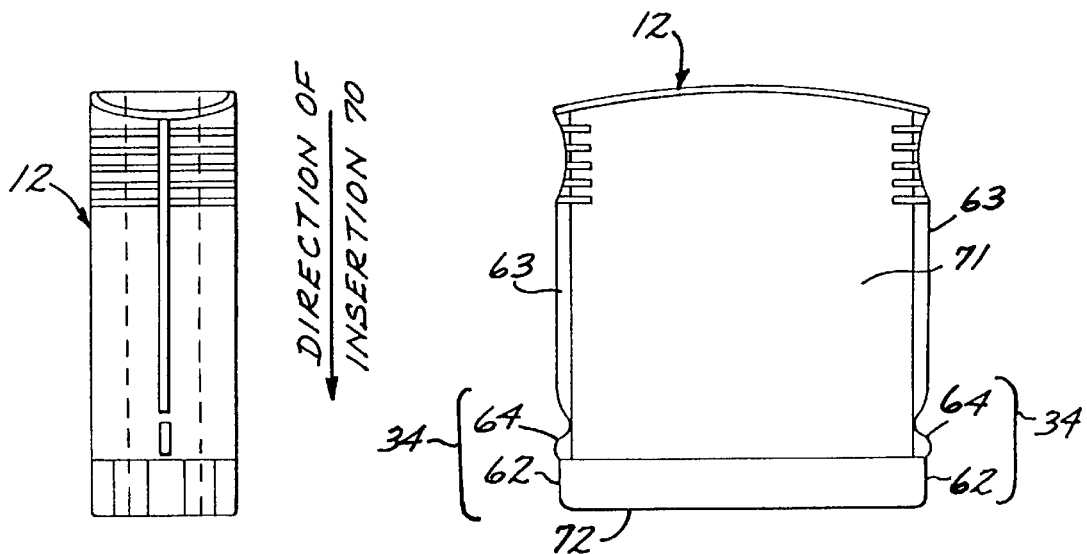
FIGS. 4a, 4b, 4c, 4d, and 4e depict an isometric view of one preferred embodiment of the ink container of the present invention.
Figure 4C:
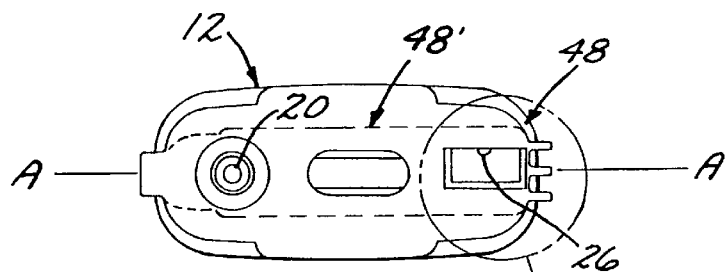
Figure 4E:
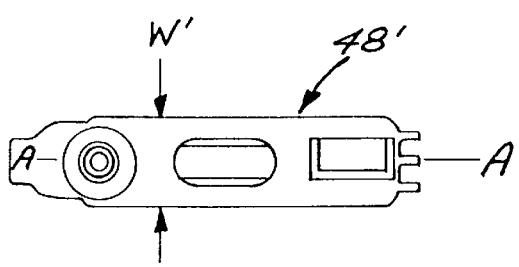
Figure 4D:
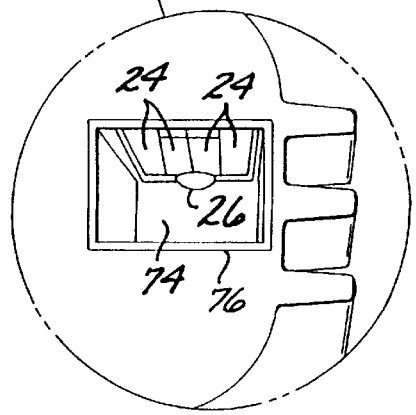

FIGS. 4a–e are isometric views illustrating two sizes of ink container 12. The larger embodiment, shown in FIGS. 4a–d, is the larger ink container 48 discussed with respect to FIG. 2. FIGS. 4a, 4b, and 4c show a side view, a frontal view, and a leading end view of the larger version 48 of ink container 12, respectively. FIG. 4d shows detail of one aspect of FIG. 4c. FIG. 4e illustrates a leading end view of the smaller ink container 48' that is plug compatible with ink container 48. Details in FIG. 4d also apply to FIG. 4e. The dashed outline of FIG. 4c represents the outside surface of smaller container 48'.

Ink container 12 has an elongate cross section perpendicular to a direction of insertion 70 such that the elongate cross section defines an axis of elongation designated as element A. The fluid interconnect 20 and the plurality of electrical contacts 24 are arranged along the axis of elongation A. This allows smaller ink container 48' to have a minimal width W'.

The ink container 12 has first and second sides 63 that are arranged along axis of elongation A. In a preferred embodiment, first and second sides 63 are substantially aligned with the direction of insertion 70. The plurality of container positioning features 34, including alignment features 62 and latching features 64 are arranged on the first and second sides to engage corresponding receiving station positioning features that include guiding features 66 and latch features 68, respectively. With this arrangement, the container positioning features, fluid outlet, and the plurality of container electrical contacts are all arranged along the axis of elongation A. This further allows the minimum size 48' of container 12 to be of minimum width W'.

The fluid outlet 20 and the container contacts 24 are arranged along axis of elongation A and are located toward the first and second sides 63. This minimizes the distance between the fluid outlet 20 and leading edge aligning feature 62 on one side and it minimizes the distance between container contacts 24 and leading edge aligning feature 62 on the other side. As discussed earlier, this improves alignment accuracy between the fluid outlet 20 and the fluid inlet 28 and between the container contacts 24 and the receiving station contacts 30.

The fluid outlet 20 is accessible on a leading edge 72 of ink container 48. Preferably, the axis of elongation A substantially bisects the fluid outlet 20 to further provide for a narrow width supply. The fluid outlet is positioned at the same location relative to the container positioning features 34 for the large ink container 48 and the small ink container 48' to assure that ink containers 48 and 48' are installable or insertable into the same particular location of receiving station 14.

As shown in detail in FIG. 4d, the plurality of container electrical contacts 24, also accessible from leading edge 72, are disposed in a cavity 74 to protect the contacts from damage or contamination caused by finger contact, ink, etc. The plurality of container electrical contacts 24 are disposed on a wall aligned with the direction of insertion 70 that allows them to make contact with the receiving station electrical contacts 30 in a sliding action. A rectangular opening 76 provides access to the cavity for receiving station electrical contacts 30. The rectangular opening has a long axis that is aligned with the axis of elongation A to help minimize the minimum width of ink container 12. In using this arrangement, the plurality of electrical contacts 24 are arranged in facing relationship with the axis of elongation A. In addition, the plurality of container electrical contacts 24 are positioned at the same location relative to the container positioning features 34 for the large ink container 48 and the small ink container 48' to assure plug compatibility between ink containers 48 and 48'.

To summarize the concept of plug compatibility, ink containers 48 and 48', having larger and smaller widths respectively, are both installable at a particular location in receiving station 14. Thus, when either container 48 or container 48' is installed, fluid outlet 20 is positioned the same relative to receiving station guiding features 66 such that fluid outlet 20 will properly engage fluid inlet 28. Similarly, when either container 48 or container 48' is installed, container electrical contacts 24 are positioned the same relative to receiving station guiding features 66 such that container electrical contacts 24 will properly engage receiving station electrical contacts 30.

Figure 5:
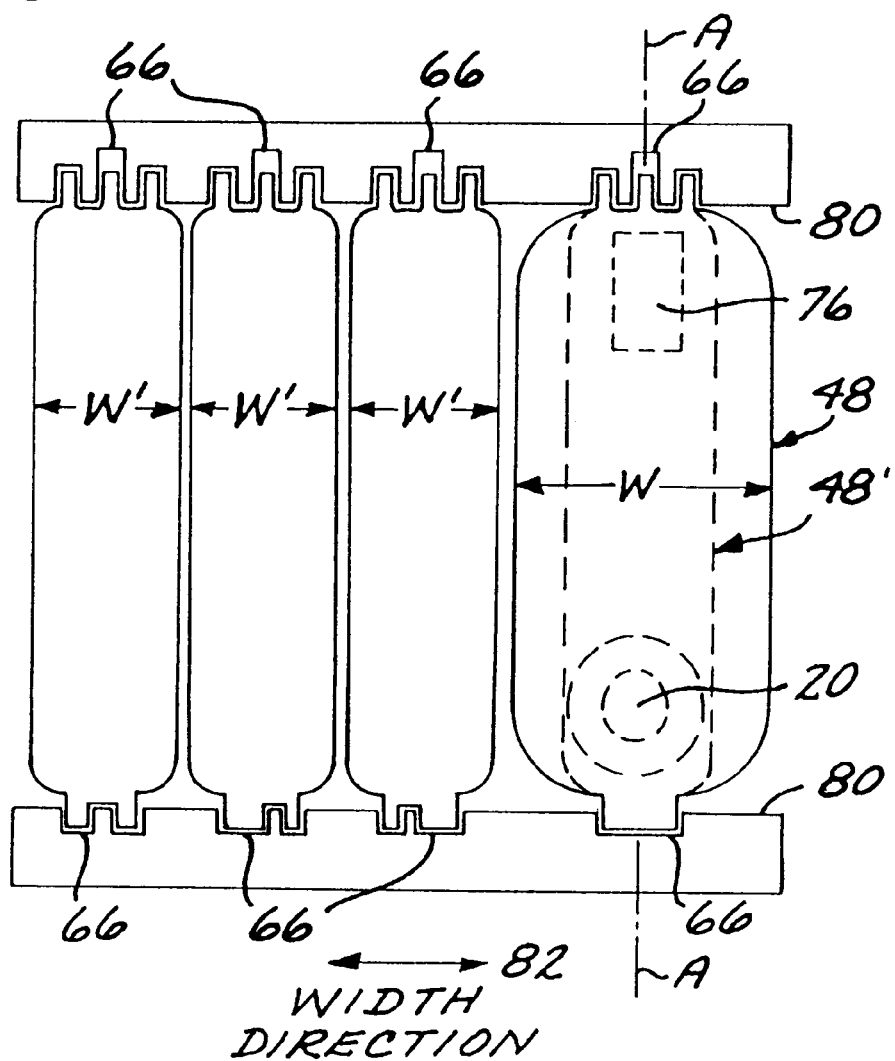
FIG. 5 depicts a simplified section view, partially broken away, of the ink container partially inserted in the ink container receiving station of FIG. 6.

FIG. 5 depicts a sectional view perpendicular to the direction of insertion 70 of a plurality of ink containers 12 taken across aligning features 62 with the containers, at least partially, inserted into the supply station 14. In this figure, the plurality of ink containers 12 includes the larger ink container 48 and the plurality of smaller ink containers 50. Also shown in dashed outline is the smaller ink container 48' that is plug compatible with ink container 48. In one embodiment, ink containers 48 and 48' contain black ink and ink containers 50 container color ink.

This figure illustrates a number of interfacing feature geometries that provide reliable connections between ink container 12 and receiving station 14 and enable multiple ink container widths. The container interfacing features include the positioning features 34, the fluid outlet 20, and the plurality of container electrical contacts 30. The container positioning features 34 include aligning features 62 and latching features 64.

Guiding features 66 are disposed on opposing walls 80 of supply station 14. Outwardly extending aligning features 62 extend into guiding features 66 to provide alignment between ink container 12 and receiving station 14.

Also shown in dashed outline in this figure is the fluid outlet 20 and the rectangular opening 76 that leads to the plurality of container electrical contacts 24. In this view, the plurality of container interfacing features, comprising the fluid outlet, the plurality of electrical contacts, and the container positioning features are projected onto a two dimensional view. In this view, the projected plurality of container interfacing features are all arranged along the axis of elongation A in order to minimize the width of the smaller black container 48'. This allows the widest possible range of plug compatible container widths.

As discussed earlier, axis of elongation A preferably substantially bisects the fluid outlet 20 and passes through the rectangular opening 76 such that the plurality of container electrical contacts 24 each face the axis of elongation A.

To assure plug compatibility between containers 48 and 48', the fluid outlet 20 and the container electrical contacts 24 are positioned at the same location along the axis of elongation for either container 48 or 48'.

Axis of elongation A is located roughly at the center of the guiding features 66 when the larger ink container 48 is installed in receiving station 14. This allows the ink container 12 width to be varied in a symmetrical manner.

Ink containers 12 are arranged along a width direction in a side-by-side manner in receiving station 14. These locations are variably spaced to accommodate a range of ink container widths. In this example, ink containers 48 and 48' have a maximum width of W. On the other hand, ink containers 50 have a maximum width of W'. Thus, the spacing between locations for ink containers 50 is just over W', whereas the spacing between the location for ink containers 48 and 48' is increased to accommodate the greater width W.

FIG. 6 depicts a block diagram of a preferred embodiment of ink jet printing system 10. Controller or printing system electronics (which, in the case of a typical printer, include a computer, a printer driver, and printer firmware electronics) 18 control the operation of printing system 10. Ink container 12 has an information storage device or memory element 26 thereon that provides information to printing system 10 indicative of a volume of ink.

This information provided by the information storage device includes parameters that are indicative of the available ink in ink container 12. In this preferred embodiment, the parameters include a first parameter that is indicative of initial available volume of ink contained in ink container 12 and a second parameter that is indicative of an amount available of ink remaining in ink container 12. Initially, the second parameter is indicative of a full ink container, i.e., it is indicative of a volume of ink equal to the initial volume of ink.

In this example, the first parameter is represented by a binary encoded value that is proportional to the initial volume of ink in container 12. The first parameter can be encoded in a variety of other ways. As a second example, the parameter could be one that is an encoded number that is accessed by the printing system which then determines an amount of available ink by comparing the encoded number with a lookup table. For the simplest lookup table example, the first parameter could just indicate a large supply or small supply for a printing system that accepts only two supply sizes. The large supply could be indicated by a one and a small supply by a zero. The system, upon reading the value, would have pre-programmed an expected initial available volume of ink for use in ink usage calculations.

In the immediate example, the second parameter is a binary number that is proportional to the fraction of available ink left in the ink container. Again, this does not have to be the case; other ways of doing this such as the aforementioned lookup table (a lookup table of fill states or available ink states) could be used.

As printing takes place, printhead 16 ejects ink onto media. Each droplet of ink has a certain drop volume, that is determined by controller 18. Controller 18 can determine this drop volume by reading a drop volume parameter from a printhead memory element 90. Controller 18 periodically calculates the amount of ink ejected by printhead 16 for some amount of time or printing. This is normally done by multiplying a calculation of the average drop volume by an amount of drops ejected to obtain an incremental volume of ink. Controller 18 then subtracts this incremental volume from the current value of the amount of ink remaining in ink container 12 to obtain a new value for amount of ink remaining. The second parameter on memory element 26 is then updated to reflect the current remaining ink volume.

As explained above, the first and second parameters are indicative of initial and current volumes of ink contained in ink container 12. However, for reliability reasons, this may not be the case. There is always some amount of error in the calculation discussed above. For example, printhead 16 may eject ink at a slightly faster rate than the assumed value. Thus, it would be preferable that first and second parameters indicate a lesser amount of ink to assure printhead 16 is never activated without a steady supply of ink.

In another embodiment, the information storage device stores a third parameter indicative of the type of ink contained in reservoir 22. A difference in ink type refers to any aspect that would make two inks non-identical or different (e.g. different colors, densities, solvents, pigment or dye colorant type, surfactants, etc.). A change in the ink from a first ink type to a non-identical second ink type will tend to affect the volume of drops ejected from printhead 16 and hence the rate of ink usage. Thus, for such a change, the system should compensate by changing the correlation of ink usage versus number of drops ejected from printhead 16.

Tracking the amount of ink remaining serves a number of functions. The printing system user can be notified of remaining ink over time. One way to do this is to provide an ink level gauge that indicates an ink level for each colorant in the printing system. The ink level gauge can be displayed on the printer chassis or upon a computer screen that is interconnected with the printing system. When the ink container 12 reaches a low ink level, the user can be notified, allowing the user to acquire another ink container before the reservoir 22 becomes fully depleted. Finally, when ink container 12 becomes empty of deliverable ink, printing can be automatically stopped to prevent printer damage. Note that providing these functions requires prior knowledge of the available ink volume within the ink container.

It should be understood that the foregoing description is only illustrative of the invention. Various alternatives and modifications can be devised by those skilled in the art without departing from the invention. For example, although a particular printer was shown, this invention could be embodied in any ink jet printing system, including color copiers, office or home printers, large format CAD (computer aided design) printers, and web printers. The example shown had a black ink container with large and small sizes. However, this invention could be used in other printing systems where color ink containers need to have multiple sizes. Accordingly, the present invention is intended to embrace all such alternatives, modifications, and variances which fall within the scope of the appended claims.

What is claimed is:

1. A replaceable ink container to be installed at a particular location in a receiving station fluidically coupled to a printhead of an ink jet printing system for providing ink from the replaceable ink container to the printhead, the receiving station having first and second opposed side walls, the replaceable ink container comprising:

a housing including a first edge, an opposite second edge, and first and second opposite sides extending between the first and second edges, at least the first side of the first and second sides of the housing including aligning features for engaging corresponding guiding features on at least the first side wall of the first and second side walls of the receiving station upon initial insertion of the replaceable ink container into the particular location on the receiving station, at least the second side of the first and second sides of the housing including latching features for engaging corresponding latching features on at least the second side wall of the first and second side walls of the receiving station subsequent to the aligning features engaging the guiding features, interengagement of the latching features with the corresponding latching features fully installing the replaceable ink container in the particular location of the receiving station and securing the replaceable ink container to the receiving station against inadvertent removal from the particular location;

an ink supply within the housing, the ink supply containing a volume of ink;

a fluid outlet on the housing, the fluid outlet being connected to the ink supply such that when the replaceable ink container is fully installed in the particular location of the receiving station, the fluid outlet engages a corresponding fluid inlet at the particular location in the receiving station to allow ink to flow from the ink supply of the replaceable ink container to the printhead;

an information storage device on the housing, the information storage device storing information indicative of the volume of ink within the ink supply; and a plurality of container electrical contacts on the housing, the plurality of container electrical contacts being connected to the information storage device such that when the replaceable ink container is fully installed at the particular location in the receiving station, the plurality of container electrical contacts engage corresponding receiving station electrical contacts to electrically couple the information storage device to the ink jet printing system.

2. The replaceable ink container of claim 1 wherein interengagement of the aligning features with the guiding features and interengagement of the latching features with the corresponding latching features positions the replaceable ink container at the particular location in the receiving station to provide a reliable fluidic connection between said fluid outlet and the corresponding fluid inlet, and a reliable electrical connection between the plurality of container electrical contacts and said corresponding receiving station electrical contacts.

3. The replaceable ink container of claim 2, wherein when the replaceable ink container is fully installed in the receiving station, the housing has an elongate cross section defining an axis of elongation forming a central plane that substantially bisects the replaceable ink container.

4. The replaceable ink container of claim 3 wherein the central plane defined by the axis of elongation substantially bisects the fluidic connection.

5. The replaceable ink container of claim 4 wherein the central plane defined by the axis of elongation substantially bisects the electrical connection.

6. The replaceable ink container of claim 3 wherein the central plane defined by the axis of elongation substantially bisects the electrical connection.

7. The replaceable ink container of claim 1, wherein when the replaceable ink container is fully installed in the receiving station, the housing has an elongate cross section defining an axis of elongation forming a central plane that substantially bisects the replaceable ink container.

8. The replaceable ink container of claim 7 wherein the central plane defined by the axis of elongation substantially bisects the fluid outlet.

9. The replaceable ink container of claim 8 wherein the central plane defined by the axis of elongation substantially bisects the plurality of container electrical contacts.

10. The replaceable ink container of claim 7 wherein the central plane defined by the axis of elongation substantially bisects the plurality of container electrical contacts.

11. The replaceable ink container of claim 7 wherein the central plane defined by the axis of elongation substantially bisects the aligning features.

12. The replaceable ink container of claim 11 wherein the central plane defined by the axis of elongation substantially bisects the latching features.

13. The replaceable ink container of claim 7 wherein the central plane defined by the axis of elongation substantially bisects the latching features.

14. The replaceable ink container of claim 7, wherein the central plane defined by the axis of elongation passes through fluid outlet, and wherein an outer surface of the housing is substantially symmetrical with respect to the central plane.

15. The replaceable ink container of claim 1 wherein upon engagement of the aligning features with the guiding features the replaceable ink container is installable at the particular location of the receiving station in one motion.

16. The replaceable ink container of claim 15 wherein the motion is linear.

17. A replaceable ink container to be installed at a particular location in a receiving station fluidically coupled to a printhead of an ink jet printing system, the receiving station providing ink from the replaceable ink container to the printhead, the replaceable ink container comprising:

a housing having an elongate cross section defining an axis of elongation forming a central plane that substantially bisects the replaceable ink container;

latching features on the housing, wherein the latching features are bisected by the central plane, the latching features being engageable with corresponding latching features of the receiving station upon insertion of the replaceable ink container at the particular location of the receiving station for securing the replaceable ink container to the receiving station against unintentional extraction from the particular location;

an ink supply within the housing, the ink supply containing a volume of ink;

a fluid outlet on the housing along the central plane defined by the axis of elongation, the fluid outlet being connected to the ink supply such that when the replaceable ink container is fully installed at the particular location in the receiving station, the fluid outlet engages a corresponding fluid inlet at the particular location in the receiving station to allow ink to flow from the ink supply of the replaceable ink container to the printhead;

an information storage device on the housing, the information storage device storing information indicative of the volume of ink within the ink supply; and a plurality of container electrical contacts on the housing along the central plane defined by the axis of elongation, the plurality of container electrical contacts being connected to the information storage device such that when the replaceable ink container is fully installed at the particular location in the receiving station, the plurality of container electrical contacts engage corresponding receiving station electrical contacts to electrically couple the information storage device to the ink jet printing system, wherein the fluid outlet and the plurality of container electrical contacts are bisected by the central plane defined by the axis of elongation to allow the replaceable ink container to be fully installed at the particular location in the receiving station.

18. The replaceable ink container of claim 17 wherein the housing includes aligning features bisected by the central plane, the aligning features engaging guiding features of the receiving station upon insertion of the replaceable ink container at the particular location of the receiving station.

19. A replaceable ink container to be installed into a receiving apparatus fluidically coupled to a printhead of an ink jet printing system, the receiving apparatus including opposing walls for receiving the replaceable ink container therebetween, the replaceable ink container comprising:

a housing having an axis of elongation perpendicular to the opposing walls when the replaceable ink container is fully installed in the receiving apparatus;

a latch feature located on the housing on the axis of elongation, the latch feature being engageable with a corresponding latch feature of the receiving apparatus when the replaceable ink container is fully installed in the receiving apparatus for securing the replaceable ink container to the receiving apparatus against unwanted extraction from the receiving apparatus;

an ink supply within the housing, the ink supply containing a volume of ink;

a fluid outlet on the housing and positioned on the axis of elongation, the fluid outlet being connected to the ink supply, the fluid outlet engaging a fluid inlet in the receiving apparatus when the replaceable ink container is fully installed in the receiving apparatus;

an information storage device associated with the housing, the information storage device storing information indicative of the volume of ink; and a plurality of container electrical contacts positioned proximate to the axis of elongation and connected to the information storage device, the plurality of container electrical contacts being connected to a plurality of corresponding electrical contacts associated with the receiving apparatus when the replaceable ink container is fully installed in the receiving apparatus.

20. The replaceable ink container of claim 19 wherein the plurality of container electrical contacts define a plane that is perpendicular to two of the opposing walls of the receiving apparatus.

21. The replaceable ink container of claim 19 wherein the housing has first and second sides, and wherein at least one of the first and second sides includes the latch feature.

22. The replaceable ink container of claim 19 wherein the latch feature has an engagement force that is aligned with the axis of elongation.

23. The replaceable ink container of claim 19 wherein the replaceable ink container is installable in the receiving apparatus in a generally downward direction relative to a gravitational frame of reference.

24. The replaceable ink container of claim 19 wherein the replaceable ink container is installable in the receiving apparatus in one linear motion.

25. An ink supply for providing ink to a printhead of an ink jet printing system, the printing system including a receiving apparatus fluidically coupled to the printhead, the ink supply comprising:

a container housing portion having an axis of elongation that is perpendicular to a vertical direction when the housing portion is installed in the receiving apparatus, the container housing portion having opposing sides located on the axis of elongation;

a latch feature located on one of the opposing sides for engaging a corresponding latch feature of the receiving apparatus upon installation of the ink supply into the receiving apparatus for mounting the ink supply to the receiving apparatus against inadvertent removal from the receiving apparatus; and a planar arrangement of electrical contacts located along the axis of elongation and parallel to the vertical direction.

26. The ink supply of claim 25 further comprising a fluid outlet located on the axis of elongation.

27. An ink supply for providing ink to a printhead of an ink jet printing system that can accept ink supplies carrying varying amounts of ink, the printing system including a receiving station fluidically coupled to the printhead, the receiving station including at least two inwardly facing opposing walls, the ink supply comprising:

an outer housing having an axis of elongation that is substantially perpendicular to and spanning at least part of the distance between the two opposing walls, the outer housing including a pair of opposing sides positioned on the axis of elongation, the outer housing having a connecting end located between the opposing sides;

a fluid reservoir;

a latch feature positioned on one of the opposing sides for engaging a corresponding latch feature of the receiving station upon insertion of the ink supply into the receiving station for securing the ink supply to the receiving station against unintentional extraction from the receiving station;

a fluid outlet coupled to the reservoir, the fluid outlet positioned on the connecting end of the ink container between the opposing ends and positioned on the axis of elongation;

a plurality of electrical contacts positioned along the axis of elongation; and an information storage device coupled to the contacts and providing information indicative of an amount of ink stored in the fluid reservoir.

28. The ink supply of claim 27 wherein plurality of electrical contacts are accesible from the connecting end.

* * * * *